United States Patent
Iovanna et al.

(10) Patent No.: US 8,559,334 B2
(45) Date of Patent: Oct. 15, 2013

(54) END-TO END INTER-DOMAIN ROUTING

(75) Inventors: Paola Iovanna, Rome (IT); Cristiano Zema, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 264 days.

(21) Appl. No.: 12/933,705

(22) PCT Filed: Mar. 28, 2008

(86) PCT No.: PCT/EP2008/053772
§ 371 (c)(1),
(2), (4) Date: Oct. 11, 2010

(87) PCT Pub. No.: WO2009/118050
PCT Pub. Date: Oct. 1, 2009

(65) Prior Publication Data
US 2011/0019674 A1    Jan. 27, 2011

(51) Int. Cl.
*H04J 9/00* (2006.01)
(52) U.S. Cl.
USPC ............ 370/254; 370/389; 370/392; 370/401
(58) Field of Classification Search
USPC ......... 370/389, 392, 217–219, 351–356, 391, 370/310, 310.2, 328, 338, 359, 395.92, 370/395.93; 709/239, 232, 238
See application file for complete search history.

(56) References Cited

U.S. PATENT DOCUMENTS

| | | | |
|---|---|---|---|
| 7,889,666 B1* | 2/2011 | Pei et al. | 370/242 |
| 7,995,500 B2* | 8/2011 | Vasseur | 370/254 |
| 8,179,905 B1* | 5/2012 | Napierala et al. | 370/401 |
| 2003/0099203 A1 | 5/2003 | Rajan et al. | |
| 2004/0039839 A1* | 2/2004 | Kalyanaraman et al. | 709/238 |
| 2005/0152284 A1* | 7/2005 | Kotha et al. | 370/254 |
| 2006/0039391 A1* | 2/2006 | Vasseur et al. | 370/409 |
| 2006/0114916 A1* | 6/2006 | Vasseur et al. | 370/397 |
| 2006/0198321 A1* | 9/2006 | Nadeau et al. | 370/254 |
| 2006/0209716 A1* | 9/2006 | Previdi et al. | 370/254 |
| 2008/0002664 A1 | 1/2008 | Li et al. | |
| 2010/0232316 A1* | 9/2010 | Takacs | 370/254 |

FOREIGN PATENT DOCUMENTS

WO    WO 03/049342 A    6/2003

* cited by examiner

*Primary Examiner* — Dang Ton
*Assistant Examiner* — Sai Aung (57) ABSTRACT

According to a first aspect of the present invention there is provided a method of constructing an end-to-end routing path across multiple packet switched domains. The method comprises generating a domains topology identifying all possible domains, the border elements of those domains and the inter-domain links. When a request is received for computation of a path from a source entity in a first domain to a destination entity in a second domain, all domains and inter-domain links that cannot or are unlikely to feature in the requested path are removed from the domains topology. Candidate intra-domain paths for each remaining domain are then computed, with each candidate intra-domain path being mapped to a logical link defined by its two ends, at least one end being a border element and the other being a border element or the source or destination entity. Attributes for each logical link are determined, together with attributes of the remaining inter-domain links. A virtual network topology is generated by combining the logical links and their associated attributes with the remaining inter-domain links and their associated attributes. This allows a best end-to-end route to be determined by analyzing the virtual network topology.

13 Claims, 9 Drawing Sheets

END-TO END INTER-DOMAIN ROUTING

TECHNICAL FIELD

The present invention relates to end-to-end traffic engineered multi-domain routing in connection-oriented packet based architectures. It is applicable in particular, though not necessarily, to Multi-Protocol Label Switching (MPLS) and its extensions (i.e. GMPLS, T-MPLS) and Traffic Engineered Provider Backbone Bridging (PBB-TE).

BACKGROUND

The Internet is a conglomeration of Autonomous Systems (AS) or domains that define the administrative authority and the routing policies of different organizations. These domains consist of routers that run Interior Gateway Protocols (IGPs) such as Routing Information Protocol (RIP), Enhanced Interior Gateway Routing Protocol (EIGRP), Open Shortest Path First (OSPF), and Intermediate System-to-Intermediate System (IS-IS) within their boundaries. Neighbouring domains are interconnected via an Exterior Gateway Protocol (EGP); the current Internet standard EGP is the Border Gateway Protocol Version 4 (BGP-4) defined in RFC 4271.

Exterior routing protocols were created to control the expansion of routing tables and to provide a more structured view of the Internet by segregating it into separate administrations, or domains, each with their own independent routing policies and unique IGPs.

These routing protocols define how routers determine their 'map' of the network and from which they can compute the shortest path to a destination, allowing routing to be a largely automatic process. However, the shortest path is not always the fastest or the best. Traffic Engineering (TE) is the process where data is routed through the network according to the availability of resources and the current and expected traffic. The required quality of service (QoS) can also be factored into this process.

Traffic Engineering may be under the control of operators whereby they monitor the state of the network and route the traffic, or provision additional resources, to compensate for problems as they arise. Alternatively, Traffic Engineering may be automated. Traffic Engineering helps the network provider make the best use of available resources, spreading the load over the layer 2 links, and allowing some links to be reserved for certain classes of traffic or for particular customers.

New technologies such as Traffic Engineered Provider Backbone Bridging (PBB-TE), and more standardized ones, such as Multi-Protocol Label Switching (MPLS) and its extensions (i.e. GMPLS, T-MPLS), provide efficient TE solutions within a single domain (i.e. intra-domain) thanks to their connection oriented nature. However, in order to support all available services end-to-end, future packet switched network architectures need to guarantee both suitable QoS and efficient use of resources between networks. This requires routing solutions that can apply Traffic Engineering for the entire path, end-to-end, both within and between domains.

The traditional approach for inter-domain TE routing is based on BGP-TE (see *IETF draft-fedyk-bgp-te-attribute-03—"Traffic Engineering Attribute"*). However, this method is only capable of applying TE constraints to computation of the inter-domain paths and to the intra-domain paths of the source and destination domains. BGP-TE does not consider detailed information relating to the intra-domain paths within any transit domains, which must be traversed to reach the destination. In addition, in a BGP-based approach, complex policy constraints can be configured, but are mostly targeted to peering agreements and economical or administrative choices. TE constraints such as maximum overload on a link and congestion occurring on a transit link are still not supported.

U.S. Ser. No. 09/981,138 discloses a system for end-to-end path computation taking into consideration detailed network resource information in the source and destination domains, while transit domains are selected according to traditional BGP-TE. BGP-TE floods the network with aggregate information in terms of routes and TE weights and, as a result, the lack of detailed information on transit domains does not allow for efficient end-to-end TE path computation.

The computation of an end-to-end path taking into account several constraints (such as QoS, bandwidth, priority, protection, etc.) in a multi-domain scenario is a very difficult issue. Detailed information is required from each domain in order to compute efficient paths using TE; the more detailed this information the more path computation meets TE requirements. This has obvious problems of scalability when expanding to incorporate more domains. In addition, a lot of intra-domain information (e.g. state of links, topology, administrative policies, etc.) is preferably confidential such that the owners/administrators of a domain would not want to share such details with other domains or administrative entities external to the domain. For these reasons the use of sophisticated intra-domain TE strategies is limited when applied to the computation of end-to-end inter-domain paths.

Standardization bodies, such as the IETF, are working on the definition of communication protocols and related architectures to deal with the multi-domain network scenario. These are based on a client-server architecture where a generic entity named the Path Computation Client (PCC) represents the client performing the path request, while the Path Computation Element (PCE) is the entity receiving the request and performing the path computation (see *IETF RFC 4655—"A Path Computation Element (PCE)-based architecture"*). The standards define a communication protocol and the requirements to be satisfied (such as protection type, priority, colour, etc.), while the solution to satisfy such requirements in a multi-domain scenario is outside of the scope of the standardization work.

SUMMARY

According to a first aspect of the present invention there is provided a method of constructing an end-to-end routing path across multiple packet switched domains supporting one or more connection oriented technologies. The method comprises generating a domains topology identifying all possible domains, the border elements of those domains and the inter-domain links. When a request is received for computation of a path from a source entity in a first domain to a destination entity in a second domain, all domains and inter-domain links that cannot or are unlikely to feature in the requested path are removed from the domains topology.

Candidate intra-domain paths for each remaining domain are then computed, with each candidate intra-domain path being mapped to a logical link defined by its two ends, at least one end being a border element and the other being a border element or the source or destination entity. Attributes for each logical link are determined, together with attributes of the remaining inter-domain links.

A virtual network topology is generated by combining the logical links and their associated attributes with the remaining inter-domain links and their associated attributes. This allows a best end-to-end route to be determined by analysing the virtual network topology.

In a particular implementation, the step of generating a domains topology further comprises, at an intra-domain path computation entity in each domain, generating inter-domain data including details of the domain border elements and their inter-domain links and sending said inter-domain data to an end-to-end path computation entity. At the end-to-end path computation entity, said inter-domain data is used to generate the domains topology.

The method may involve, at the end-to-end path computation entity, generating a virtual Domains Topology request for each domain including each of the border elements of each domain that may feature in the end-to-end path, any attributes required by said end-to-end path and, for the source and destination domains, the source element and the destination element respectively and sending said virtual Domains Topology request to the intra-domain path computation entity of the source domain, the destination domain and of all possible transit domains substantially simultaneously. Upon receipt of a virtual Domains Topology request at each intra-domain path computation entity, the candidate intra-domain paths for the request are computed.

The step of determining the attributes for each logical link may comprise determining a cost parameter that represents the availability/suitability of the logical link with respect to the other logical links computed within that domain.

An intra-domain path computation entity may send a virtual Domains Topology reply to the end-to-end path computation entity, the reply including the identified logical links, the border elements that feature in the logical links and the associated summarised attributes and, for the source and destination domains, also the source and destination element respectively. Upon receipt of the virtual Domains Topology reply at the end-to-end path computation entity, the logical links and their associated attributes may be combined with the remaining inter-domain links and their associated attributes. An attribute for a link may be given as a percentage of the total network resources that are available within the domain for that link.

The step of generating a virtual Domains Topology request for each domain may comprise including within the virtual Domains Topology request, an identification of the attribute (s) to be determined by the intra-domain path computation entity. The virtual Domains Topology request may further include an identification of the routing strategy or algorithm to be used by the intra-domain path computation entity to compute the candidate intra-domain paths.

In order to make the system dynamic, an intra-domain path computation entity may monitor its inter-domain data and send updates of the inter-domain data to the end-to-end path computation entity. Updates of inter-domain data may be sent to the end-to-end path computation entity when changes in the inter-domain data cross some defined threshold(s).

According to a second aspect of the present invention there is provided a method of facilitating construction of an end-to-end routing path across multiple domains supporting packet based connection oriented technologies. The method comprises receiving inter-domain data from border elements of said domain, said inter-domain data including information relating to each border element of said domain and the links between those border elements of the domain and border elements of other domains. Said inter-domain data is then sent to an end-to-end path computation entity. Subsequently, a virtual Domains Topology request is received from said end-to-end path computation entity, said virtual Domains Topology request including the border elements of that domain that may feature in the end-to-end path and any attributes required by said path. The candidate intra-domain paths are computed, and attributes determined for each of the computed candidate intra-domain paths. Each candidate intra-domain path is then mapped to a logical link defined by its two ends, at least one end being a border element and the other being a border element or a source or destination entity. Finally, a virtual Domains Topology reply is sent to the end-to-end path computation entity, including the logical links and their associated attributes.

Considering the process of determining attributes, consider the example where the path computation criteria of the E2E-PCE is the minimum hop. The cost associated with the candidate path is therefore the number of hops to go from the head element of the path to the tail element (e.g. ten). That number is therefore the cost to be associated with the corresponding logical link (i.e. the cost of traversing the domain using that logical link is the same cost as that involving a path of ten hops).

According to a third aspect of the present invention there is provided a method of constructing an end-to-end routing path across multiple domains supporting packet based connection oriented technologies. The method comprises receiving inter-domain data from intra-domain path computation entities, said inter-domain data including information relating to each border element of each domain and the links between those border elements of each domain and border elements of other domains. A domains topology is generated, identifying all possible domains, the border elements of those domains and the inter-domain links. An end-to-end path request is received from a source entity, said end-to-end path request including details of the desired source and destination of a path and any attributes required for that path.

All domains and inter-domain links that cannot or are unlikely to feature in the path are removed from the domains topology, and a virtual Domains Topology request(s) is generated, including each of the border elements of each domain that may feature in the path and any attributes required by said path. The virtual Domains Topology request(s) is sent to an intra-domain path computation entity of the source domain, the destination domain and of all possible transit domains simultaneously.

A virtual Domains Topology reply is received from each said domain, the virtual Domains Topology reply including logical links representing each candidate intra-domain path and its associated attributes. The attributes of each of the remaining inter-domain links are determined, and a virtual network topology generated by combining the logical links and their associated attributes with the remaining inter-domain links and their associated attributes. Finally, a best end-to-end route is determined by analysing said virtual network topology.

DETAILED DESCRIPTION

An end-to-end route determination process for packet based connection oriented technologies is presented here which makes use of a heterogeneous virtual topology including all information from both the intra-domain and inter-domain elements of the route. The topology of the network is separated into two layers, the intra-domain layer and the inter-domain layer. The inter-domain layer relates to a heterogeneous virtual topology that is comprised of both real and virtual elements. Its elements are the Border Elements (BEs) of the source domain, destination domain and any transit domains, the physical inter-domain links (InterLinks) connecting different domains, the source node of the source domain, the destination node of the destination domain, the Logical Links (LLs) connecting all the BEs of each transit domain, and the logical links connecting the BEs of the source/destination domain to the source/destination node. The intra-domain layer relates to the real topology of each domain. It is comprised of the source domain, the destination domain and each of the transit domains. Each domain is further comprised of a number of interconnected intra-domain nodes, including the source and destination nodes in the source and destination domains respectively, and the domain BEs.

For the purpose of the following discussion, the network architecture is PCE-based, each domain having at least one intra-domain PCE (Intra-PCE) responsible for calculating the intra-domain routing and there being at least one end-to-end PCE (E2E-PCE) responsible for calculating the entire end-to-end route, combining intra-domain and inter-domain routing.

Figure 1:
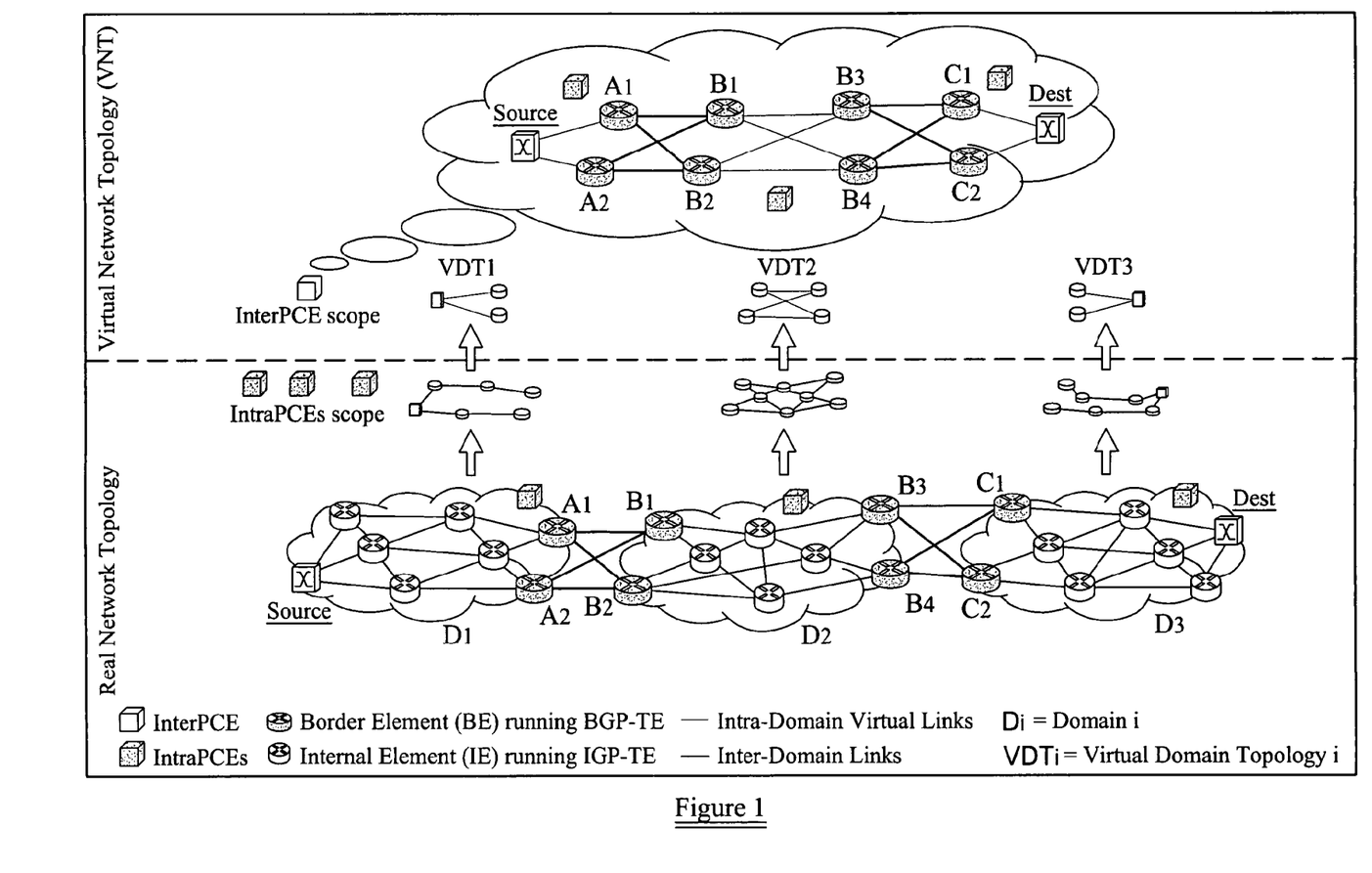
FIG. 1 illustrates a simplified diagram of a PCE-based network topology and its translation to a virtual network topology.

FIG. 1 shows a simplified diagram of a PCE-based network topology and its translation to a virtual network topology. The complete topology of the network is shown below the dashed line and features a source within a source domain D1, a destination within a destination domain D3 and one transit domain D2. Each of the domains includes a number of interconnected nodes or Internal Elements (IEs), Border Elements and an Intra-PCE. The Border Elements of domain D1 are connected to Border Elements of the transit domain D2. Other Border Elements of domain D2 are connected to the Border Elements of the destination domain D3.

Each Intra-PCE is aware of the topology of its domain network and is capable of calculating TE routing within the domain according to known TE routing methods (e.g. according to intra-domain path selection criteria, metrics, policies, rules and target functions). The Intra-PCE uses these methods to determine the 'best' candidate paths between intra-domain nodes and the Border Elements or, when the domain is a transit domain to be traversed, between separate Border Elements of the domain. Candidate paths computed by different domains are defined as "best" according to different criteria, so the local cost parameter associated to each best path within each different domain has a different meaning.

These candidate paths are then translated into Logical Links (LLs), defining the path through a domain by its two end points. These Logical Links are combined with the inter-domain links, with source and destination nodes and with BEs to form the overall virtual network topology as shown above the dashed line in FIG. 1.

In addition, the Intra-PCE translates the costs of candidate paths into one or more costs for each of the Logical Links. These costs are chosen as the parameters (or a summary of them) needed by the E2E-PCE to compute the End-to-End Best Path (E2E-BP) according to its TE routing methods (e.g. according to inter-domain path selection criteria, metrics, policies, rules and target functions). This allows the costs of LLs within different domains to be consistent, and allows them to be consistent with inter-domain link costs.

Traffic balancing, which is a challenging issue, can be achieved by choosing a LL cost parameter that represents the availability/suitability of a LL with respect to the other LLs computed within that domain. The parameters of these costs are determined according to the desired routing objectives. As an example, the attributes of a logical link could be given as a percentage of the total network resources within the domain that are available for the candidate path corresponding to that logical link, termed "Equivalent Available Resources" (EAR). Such a parameter would be easily comparable across all domains. The E2E-PCE is then able to use the associated attributes of the links to compute an appropriate end-to-end path across multiple domains.

Figure 6:
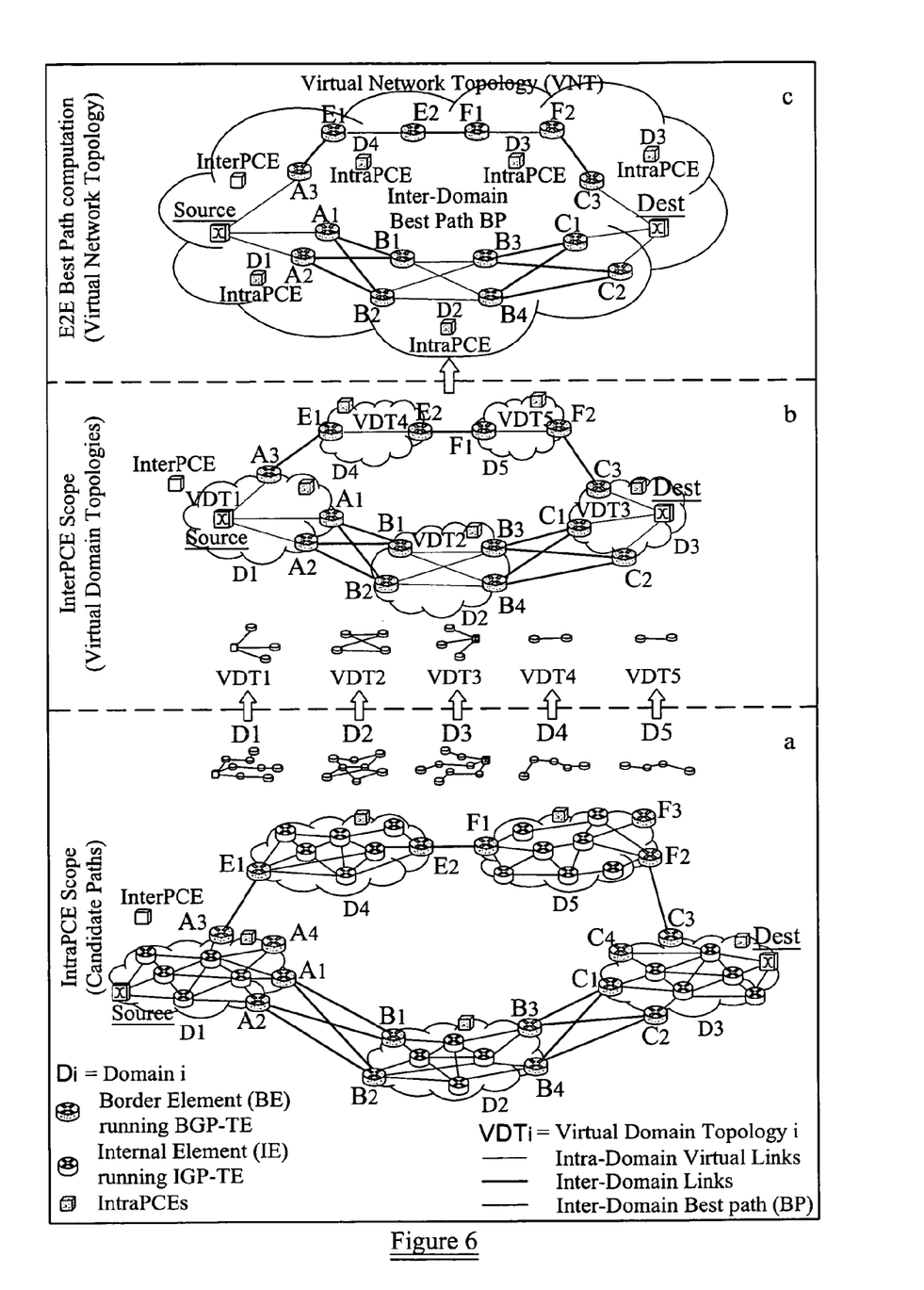
FIG. 6a illustrates the candidate paths in the intra and inter domains of the network of FIG. 2.
FIG. 6b illustrates the Virtual Links of the network of FIG. 2 combined into a Virtual Domains Topology.
FIG. 6c illustrates the Virtual Network Topology of the network of FIG. 2.

By way of example, consider the Virtual Domains Topology VDT2 in FIG. 6b. This consists of four LLs (LL1, LL2, LL3, LL4). Now assume further that the Intra-PCE of the domain (D2) assigns EAR values to LLs according to the formula:

$$EAR=[AABW+(100-ANL)]/2$$

where AABW is the Average Available Bandwidth of all links and ANL is the Average Node Load of all nodes along the candidate path corresponding to a logical link. Table 2 below illustrates example percentage AABW and ANL values for the four LLs. In such a situation, if all other conditions are equal, the E2E-PCE will choose LL1 to traverse D2, because LL1 has a higher EAR, so traffic will be better balanced using that LL.

The application of the solution requires two phases; the creation of a Domains Topology (DT), within which the domains are seen as nodes and their border elements as node ports, and the computation of the End-to-End Best Path (E2E-BP).

Phase 1: Domains Topology Generation

The generation of the Domains Topology is independent of the specific path request as its objective is to give the E2E-PCE a global, inter-domain view of the network. This phase is therefore carried out off-line.

Figure 7:
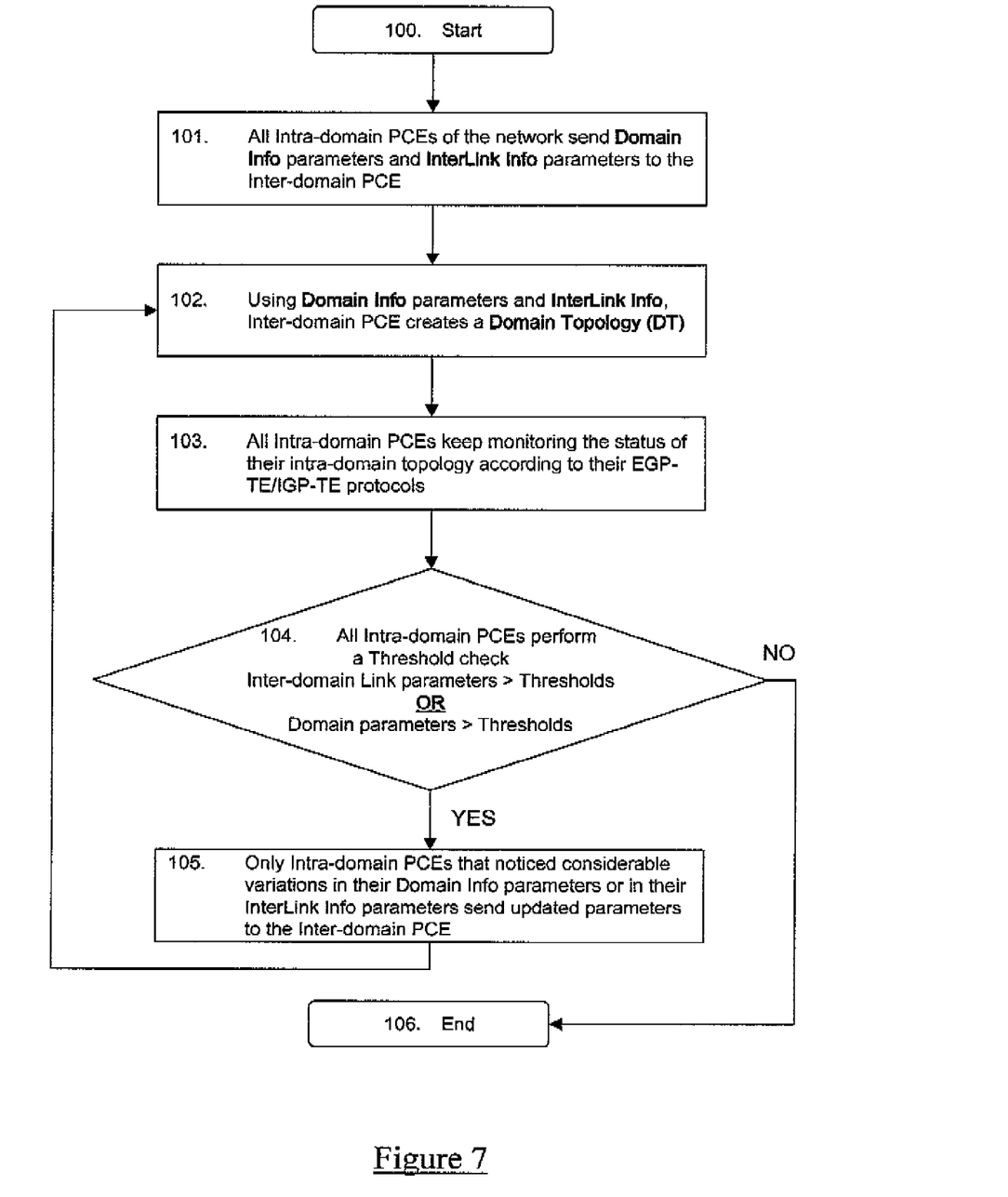
FIG. 7 is a flow diagram illustrating the process of creating and updating a Domains Topology.

With reference to the flow diagram of FIG. 7, the Phase 1 process commences at step 100. Initially, step 101, each Intra-PCE sends to the E2E-PCE a set of information concerning its domain (Domain Info) and a set of information concerning the Border Elements of the domain and their inter-domain links (InterLinks Info). The Domain Info can be parameters such as the administrative attributes to go from one domain to another (according to Service Level Agreements and/or Service Level Specifications). The InterLink information can be parameters concerning both the InterLinks and Border Elements such as link bandwidth or load on the Border Elements. Using this information the E2E-PCE creates the Domains Topology, step 102.

Each Intra-PCE monitors, step 103, the intra-domain network resources (according to IGP-TE/EGP-TE e.g. OSPF-TE/BGP-TE) and updates its Domain Info and InterLink Info accordingly. To reduce the traffic on the network the Intra-PCEs will only notify the E2E-PCE when these changes are significant, as defined by exceeding some threshold, steps 104 and 105. The DT can then be updated if the E2E-PCE receives new parameters from an Intra-PCE. The process ends at step 106.

Phase 2: End to End Best Path Computation

Figure 8:
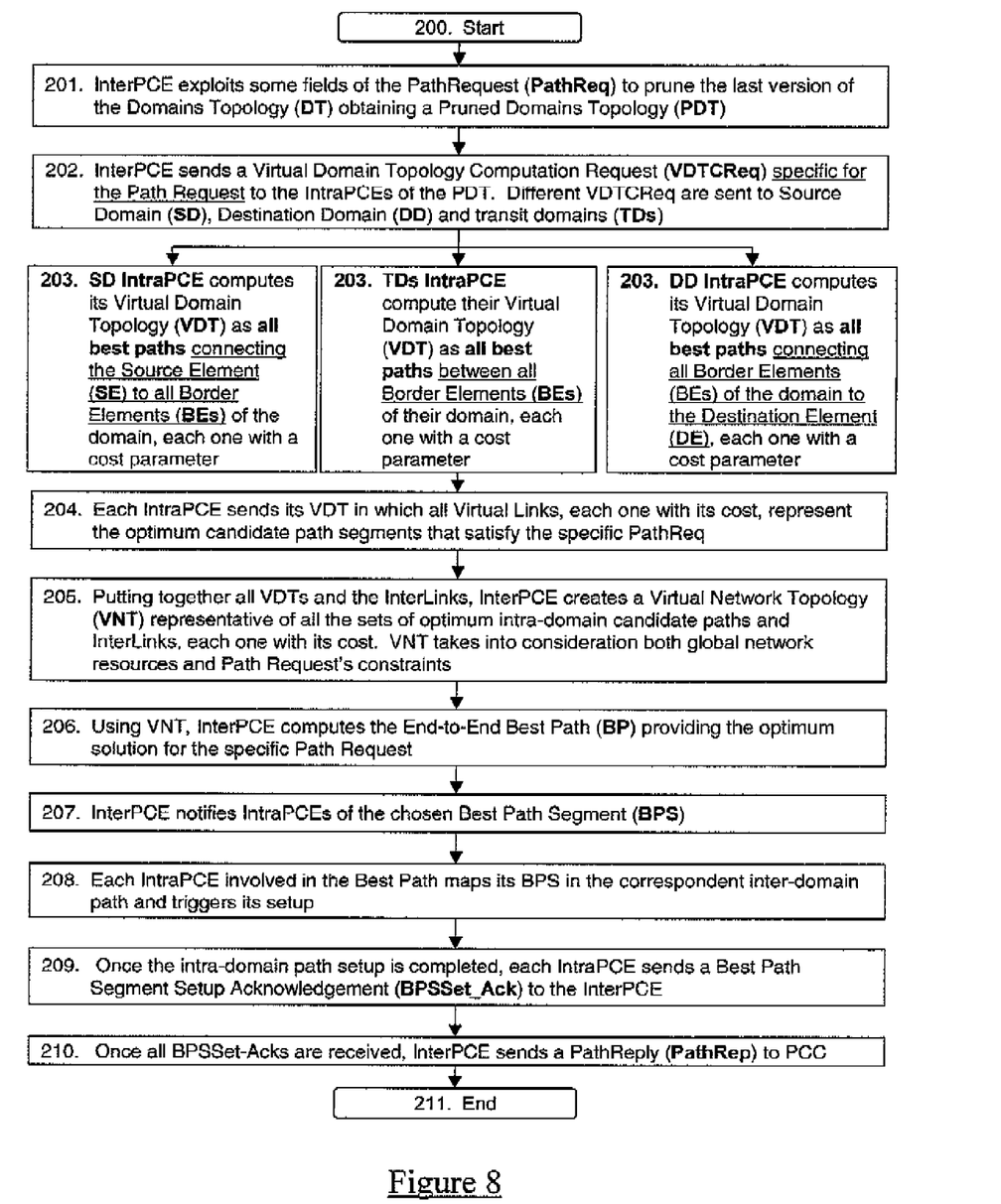
FIG. 8 is a flow diagram illustrating the process of computing an end-to-end best path.

This process is illustrated in the flow diagram of FIG. 8, and commences at step 200. Consider a source node wishing to send data to a destination node. The source node generates a message, or Path Request, containing details of the destination and any constraints for the path. This Path Request is sent either directly to the E2E-PCE or via the Intra-PCE of the source domain.

After receipt of a Path Request from a source node, the E2E-PCE uses the Domains Topology information and any constraints specified within the Path Request to 'prune' those domains and/or InterLinks that cannot feature in the path, step 201.

The E2E-PCE then simultaneously sends Path Requests to the Intra-PCEs of the remaining domains, step 202, requesting them to provide the intra-domain Logical Links that may be suitable to the specific path request, and the associated attributes of each link.

Each Intra-PCE calculates the possible candidate paths for the specific path request using any appropriate TE routing method(s), step 203. The source domain Intra-PCE computes the candidate paths connecting the source with the Border Elements of the domain, the transit domain Intra-PCEs compute the candidate paths interconnecting its Border Elements, and the destination domain Intra-PCE computes the candidate paths connecting its Border Elements to the destination. If the path request included certain constraints (such as colour as defined in RFC2702, disjointness or path separation, protection, etc) the Intra-PCE also determines the suitability of each path for meeting these requirements. Each path is then translated into a Logical Link and provided, along with the appropriate attributes parameter, to the E2E-PCE, step 204. The E2E-PCE then applies any suitable TE routing method to a combination of these Logical Links and the InterLinks to select the best end-to-end path, considering the associated attributes of all of the links, step 206.

The end-to-end path provided by the E2E-PCE will be optimum, according to a TE routing strategy, if both the Intra-PCE and E2E-PCE apply the same TE routing strategy. However, if the inter-domain and intra-domain routing strategies do differ, then the Intra-PCE can provide attribute parameters suitable for use with the TE routing algorithm used by the E2E-PCE. This could be implemented by the incorporation of a request/reply mechanism wherein the Path Request sent from the E2E-PCE to the Intra-PCE could specify the routing strategy that should be used by the Intra-PCE and/or the parameters of the attributes of the logical links required by the E2E-PCE. This makes the present solution extremely flexible, enabling the two layers to use independent routing strategies whilst maintaining efficient end-to-end routing.

Figure 2:
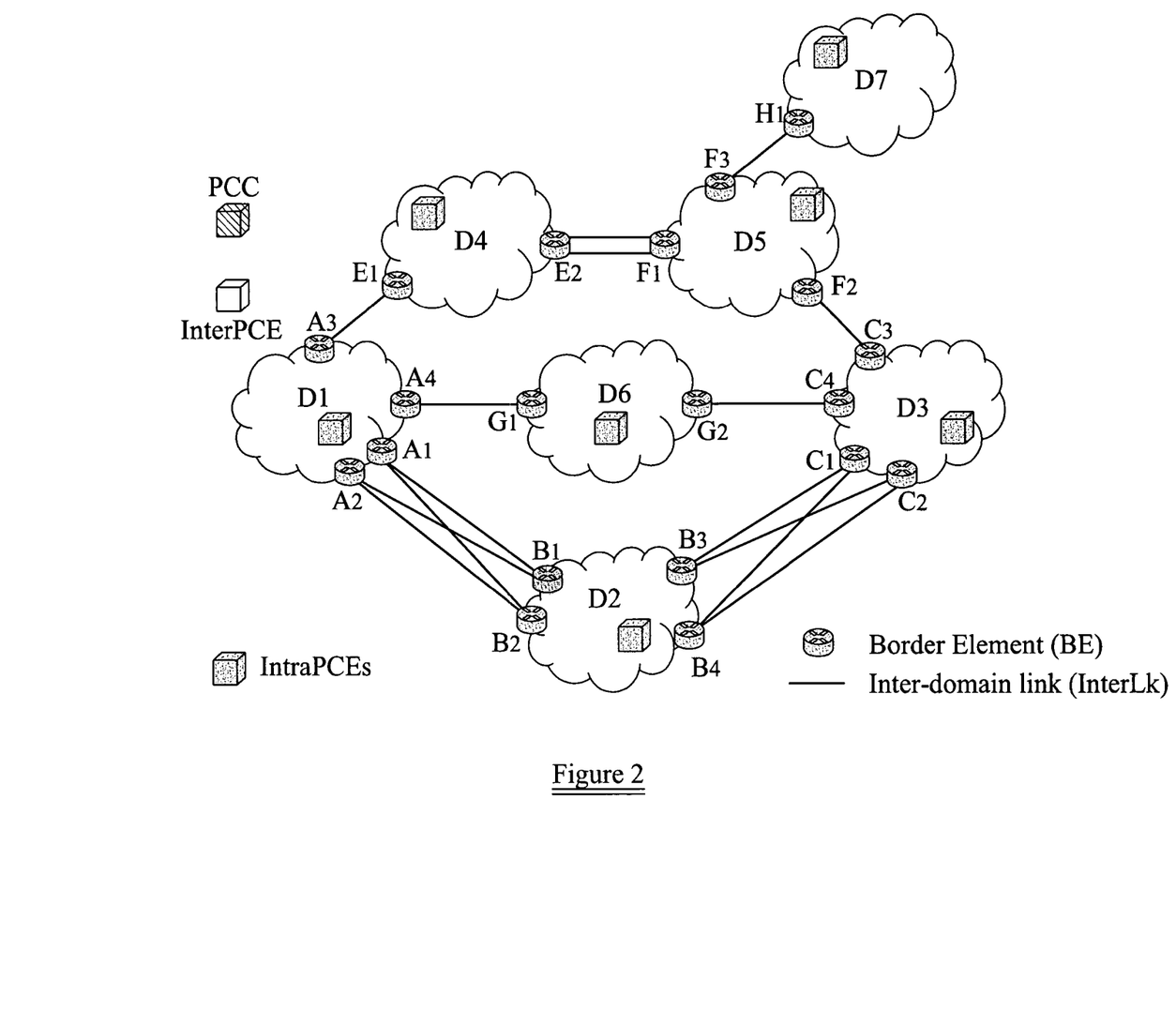
FIG. 2 illustrates a simplified diagram of a PCE-based network comprised of seven domains.

The solution will now be further discussed by way of example, with reference again to the steps of the flow diagram of FIG. 8. FIG. 2 shows a simplified diagram of a PCE-based network comprising seven domains. For the purpose of the following discussion, it is assumed the entity that sends the Path Request (PathReq) is a Path Computation Client (PCC) that can be any element of any domain and therefore has been represented as not belonging to any domain. Domains D1 to D7 each have a number of Internal Elements (not shown for simplicity), Border Elements and an Intra-PCE. Once again, the Border Elements of the domains are interconnected by a number of InterLinks.

Figure 3:
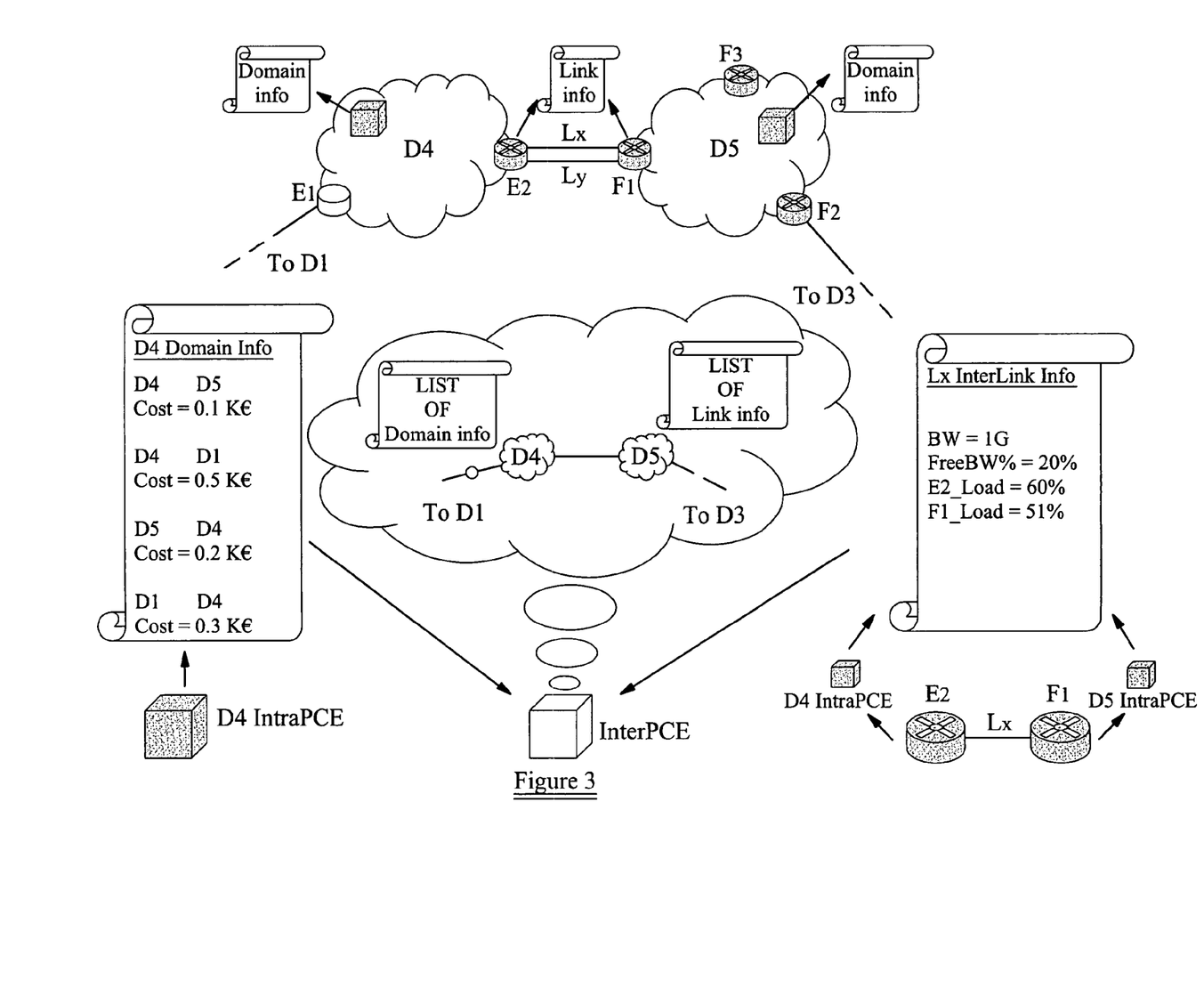
FIG. 3 illustrates domains D4 and D5 of the network of FIG. 2, their InterLinks, and a type of information collected by an InterPCE in order to generate a Domains Topology (DT)
Figure 4:
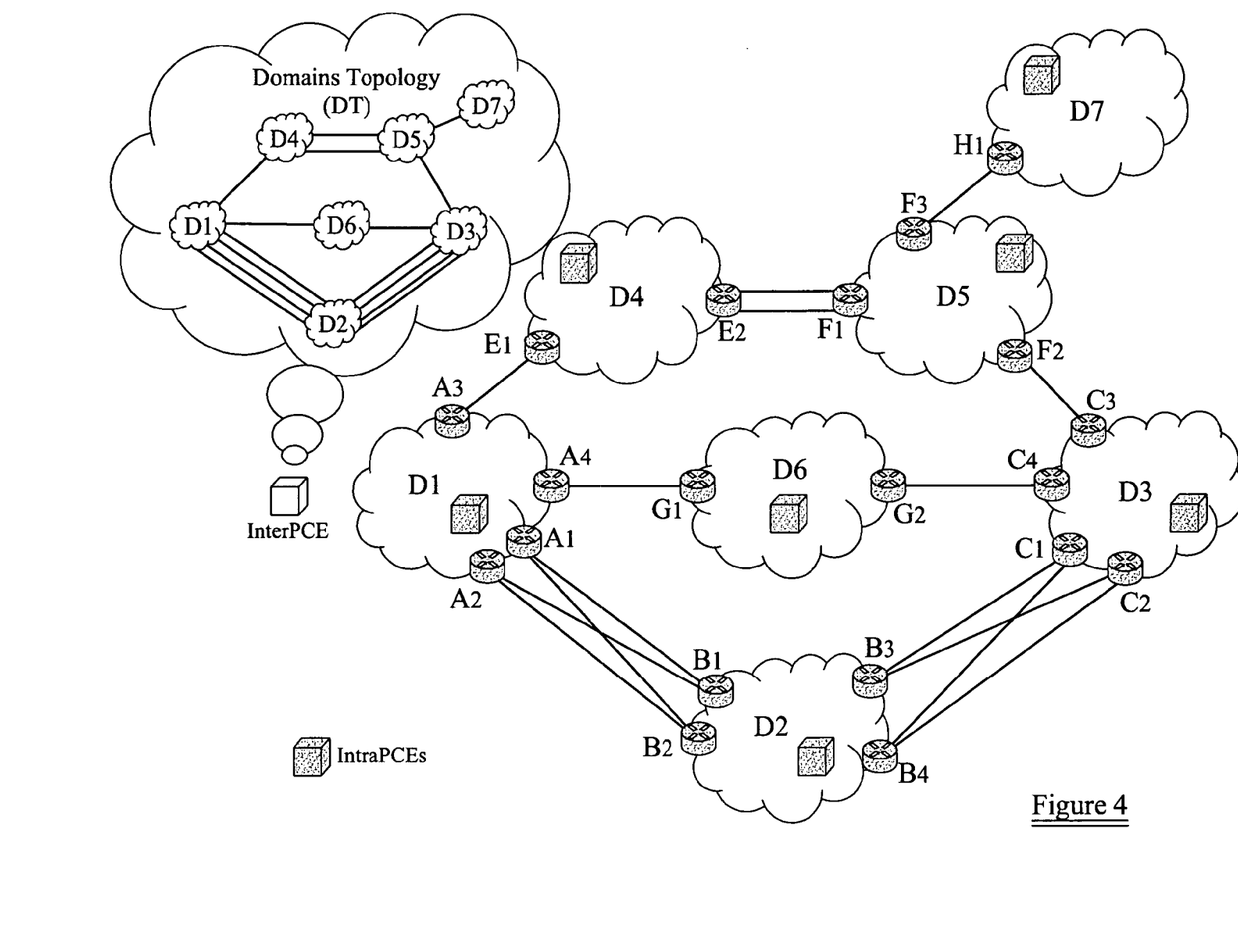
FIG. 4 illustrates the Domains Topology of the network of FIG. 2.

FIG. 3 illustrates domains D4 and D5 of FIG. 2 and their InterLinks, Lx and Ly. The BEs of D4 and D5, that is E2 and F1 respectively, provide the information relating to InterLink Lx to their Intra-PCEs, which in turn provide this information and the Domain Info to the E2E-PCE. All Intra-PCEs send their Domain Info and InterLink Info parameters to the E2E-PCE, via the PCE communication Protocol (PCEP), with extensions where needed. Using this information the E2E-PCE creates the Domains Topology within which the domains are seen as nodes and their border elements as node ports, as shown in FIG. 4.

A Path Request is then generated by a PCC (which could be the source node) and sent to the E2E-PCE. The Path Request must specify a Source Address (SA) and a Destination Address (DA) that are used to discover the Source Domain (SD) and the Destination Domain (DD). The Path Request also contains further fields for specifying constraints for the path. The following list is an example of some of the constraints that could be specified within the Path Request:

Service Type (e.g. unicast, multicast or broadcast)
LSP Type (e.g. unidirectional or bidirectional, E-LSP or L-LSP)
Bandwidth Upstream
Bandwidth Downstream
Max_Node_Load (i.e. the maximum allowed percentage of node load along E2E path)
QoS (e.g. classes 0 to 7 of DiffServ)
Protection (e.g. 1+1, 1:1, 1:n)
Straight or loose Link Disjointness along E2E path
Straight or loose Node Disjointness along E2E path
Straight or loose Domain Disjointness
Straight or loose Inter-domain Link Disjointness
Objective Function (e.g. minimize Node Load, maximize the residual Bandwidth along E2E path, perform traffic balancing, etc.)
DomExcl (i.e. Explicit Domains Exclusion from the requested path)

Table 2 below shows an example Path Request with a set of constraints that must be satisfied by the computed path. Applying the Path Request of Table 2 to the topology of FIG. 2 leads to the creation of the Pruned Domains Topology, the E2E-PCE performing the following pruning:

The DomExcl field specifies D6 as an excluded domain and therefore D6 and its related InterLinks are pruned.

D7 is a leaf-connected domain that is neither the SD nor the DD. No path from the SD to the DD will traverse this domain and therefore D7 and its related InterLinks are pruned.

Assuming InterLink Lx is congested, either it has insufficient bandwidth or one or both of its BEs has a load exceeding that specified in the PathReq, then Lx is also pruned.

Figure 5:
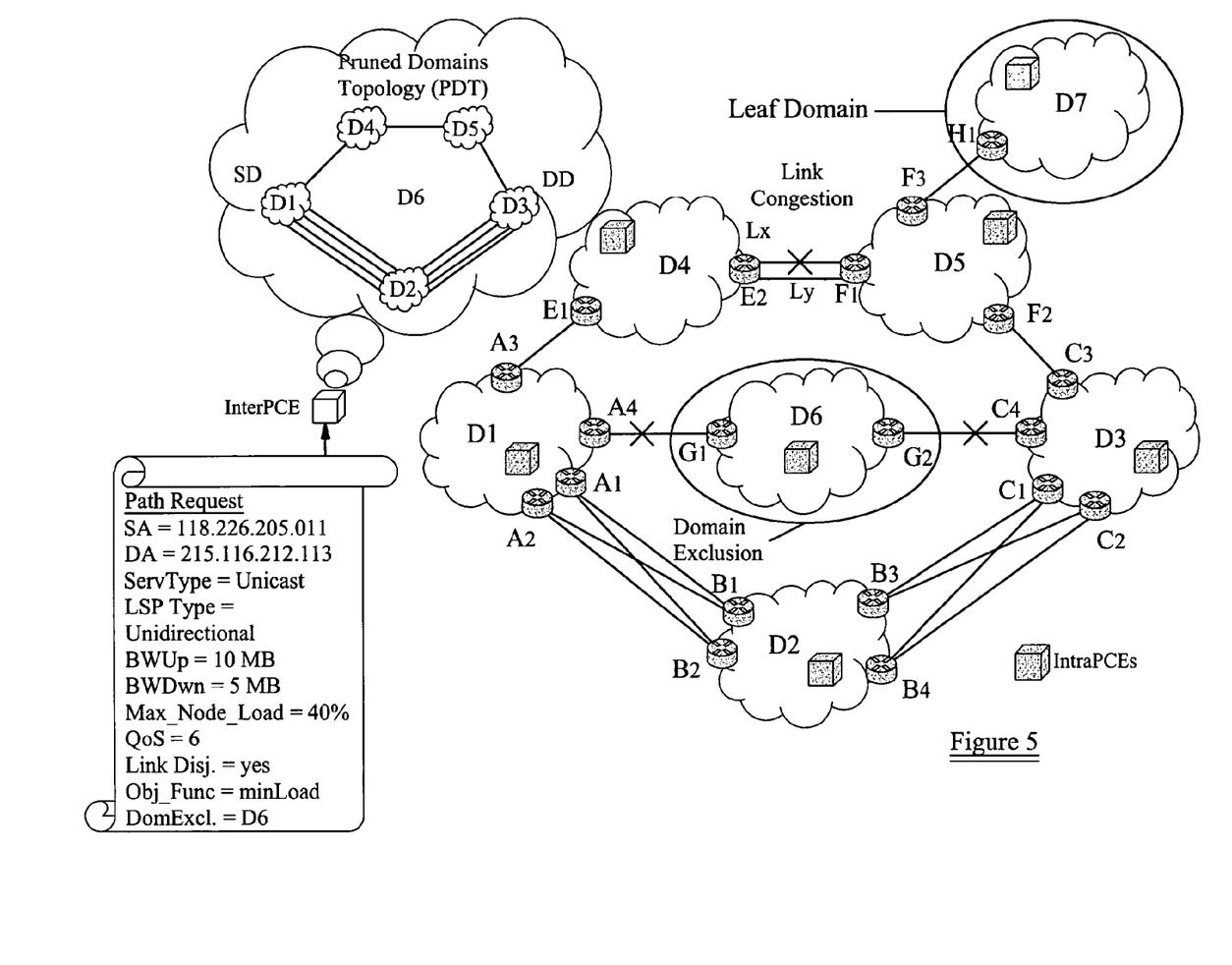
FIG. 5 illustrates the pruning of the Domains Topology of FIG. 4 according to the Path Request of Table 2, and the resultant Pruned Domains Topology (PDT)

FIG. 5 illustrates this pruning of the network topology of FIG. 2 according to the Path Request of Table 2, as represented by those circled domains and crossed-out InterLinks, and the resultant Pruned Domains Topology (PDT)

Following creation of the Pruned Domains Topology the E2E-PCE sends a Virtual Domains Topology Computation Request (VDTCReq), with the same constraints as the Path Request, to the Intra-PCEs of the Source Domain, the Destination Domain and all possible Transit Domains (TDs). Different VDTCReqs are sent to the Source Domain, to the Destination Domain and to all the possible Transit Domains because these domains have to provide different kinds of Virtual Domain Topologies (VDTs) (i.e. made by different elements), as explained above.

The Intra-PCEs compute all candidate paths that meet the VDTCReq according to local, intra-domain path selection criteria, metrics, policies, rules and target functions. As previously discussed, these criteria used by the Intra-PCE can differ to those applied by the E2E-PCE. In such circumstances, once the candidate paths that satisfy the Path Request have been computed, the attributes associated with each path are determined in accordance with those parameters needed by the E2E-PCE to compute the End-to-End Best Path (E2E-BP). The Intra-PCE then forms a Virtual Domains Topology (VDT) of the domain, including a set of Logical Links (LLs) representing each possible candidate path connection and their associated attributes. A Virtual Domains Topology for the Source Domain provides Logical Links for the best paths connecting the Source Element (SE) to each of those Border Elements of the domain that could possibly feature in the route. A Virtual Domains Topology for a Transit Domain provides the Logical Links for the best paths between those Border Elements of the domain that could possibly feature in the route. A Virtual Domains Topology for the Destination Domain provides the Logical Links for the best paths connecting each of the Border Elements of the domain that could possibly feature in the route to the Destination Element (DE).

FIG. 6a illustrates the candidate paths (i.e. the best paths among all the possible ones connecting the same couple of elements) in the intra and inter domains following domain pruning of the network topology of FIG. 2. The candidate paths through each domain are shown separately at the top of FIG. 6a. Each of these paths is then translated into a Logical Link and all of them are combined into a Virtual Domains Topology as shown at the bottom of FIG. 6b.

Once the Virtual Domains Topology is created, each IntraPCE sends a Virtual Domains Topology Computation Reply (VDTCRep), carrying the Virtual Domains Topology, to the E2E-PCE.

Following receipt of the VDTCRep from all of the requested domains the E2E-PCE can create a Virtual Network Topology (VNT), in which nodes are the Source Element, Destination Element and Border Elements of all domains of the Pruned Domains Topology, and the links are the intra-domain Logical Links and inter-domain links (each one with its attributes), as shown in FIG. 6c Using the Virtual Network Topologies, the E2E-PCE can compute the End-to-End Best Path (E2E-BP) using a known TE routing method, taking into consideration the constraints specified in the Path Request and both the intra and inter-domain network resources. The E2E-BP comprises a set of inter-domain InterLinks and a set of Best Path Segments (BPSs), each Best Path Segment corresponding to a selected Logical Link in the Virtual Domain Topologies.

The E2E-PCE then sends a Best Path Segment Communication (BPSCom) to the Intra-PCEs of the domains involved in the Best Path, step 207. The Best Path Segment Communication carries the Best Path Segment (i.e. the LL selected from those provided in that domains VDT) and all the information needed by the inter-domain signalling protocols, according to the chosen signalling technique. Each Intra-PCE that receives a BPSCom, maps the Logical Link to the corresponding intra-domain path and triggers its set up, step 208.

Once the intra-domain path setup is completed, each Intra-PCE sends a Best Path Segment Setup Acknowledgment (BPSSet_ACK) to the E2E-PCE, step 209. Following receipt of a BPSSet_ACK from all the domains in the path, the E2E-PCE sends a Path Reply (PathRep) to the PCC to inform it about the result of end-to-end inter-domain path computation, step 210.

Figure 9:
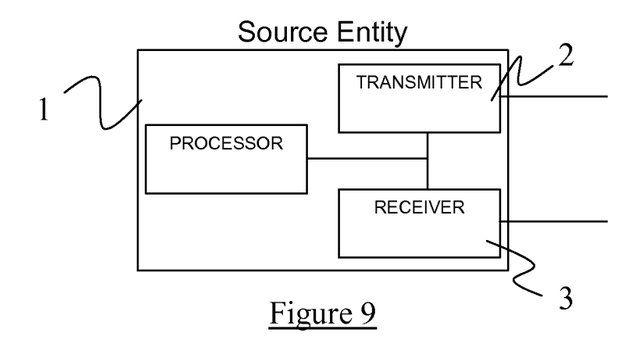
FIG. 9 illustrates schematically a source entity according to an embodiment of the invention.
Figure 10:
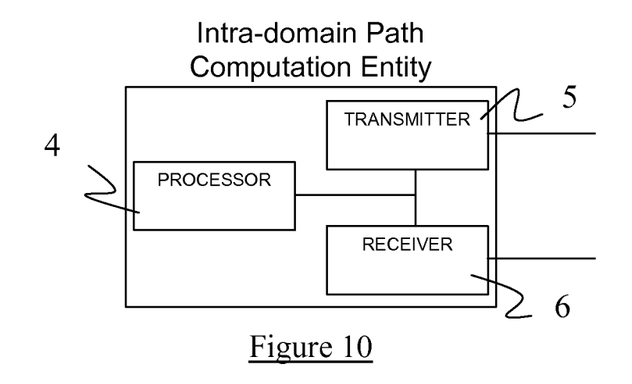
FIG. 10 illustrates schematically an intra-domain path computation entity according to an embodiment of the invention.
Figure 11:
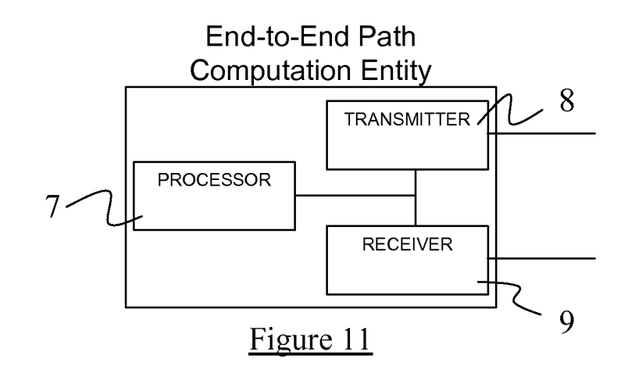
FIG. 11 illustrates schematically an end-to-end path computation entity according to an embodiment of the invention.

FIG. 9 illustrates schematically a source (or destination) entity which might be an endpoint for a communication session established via a plurality of discrete domain. The entity comprises a processor 1, a transmitter 2, and a receiver 3. Both the transmitter and receiver are interfaced to an access domain of the entity. The entity may be configured to generate and send a Path Request as discussed above. FIG. 10 illustrates schematically an Intra Domain PCE, again comprising a processor 4, transmitter 5, and receiver 6. Both the processor and receiver are interfaced to a local domain of the PCE, which might be a transit domain for a particular session, or the source or destination domain. Similarly, FIG. 11 shows an E2E-PCE comprising processor 7, and a transmitter 8 and receiver 9. The E2E-PCE may be a standalone node, or may also implement Intra Domain PCE functionality for a given domain.

It will be appreciated by the person of skill in the art that various modifications may be made to the above described embodiments without departing from the scope of the present invention.

TABLE 1

| LL | % of Average Available BW (AABW) | % of Average Node Load (ANL) | EAR |
|---|---|---|---|
| LL 1 | 90% | 20% | 85% |
| LL 2 | 80% | 70% | 55% |
| LL 3 | 30% | 20% | 55% |
| LL 3 | 10% | 80% | 15% |

TABLE 2

| Path Request | |
|---|---|
| SA | 118.226.205.011 |
| DA | 215.116.212.113 |
| ServType | Unicast |
| LSPType | Unidirectional |
| BWUp | 10 MB |
| BWDwn | 5 MB |
| Max_Node_Load | 40% |
| QoS | 6 |
| Link Disj. | Yes |
| Obj_Func | MinLoad |
| DomExcl. | D6 |

The invention claimed is:

1. A method of constructing an end-to-end routing path across multiple packet switched domains supporting one or more connection oriented technologies, the method comprising the steps of:

generating a domains topology identifying all possible domains from said multiple packet switched domains, the border elements of those domains, and inter-domain links among those domains;

receiving a request for computation of a path from a source entity in a source domain to a destination entity in a destination domain;

removing from the domains topology all domains and inter-domain links that are unlikely to be traversed in the requested path;

computing candidate intra-domain paths for each domain remaining after the removal step, wherein each candidate intra-domain path is capable of inclusion in the requested path from the source entity to the destination entity;

mapping each candidate intra-domain path to a corresponding domain-specific logical link defined by its two ends, one end being a border element and the other being another border element or the source or destination entity;

determining attributes for each logical link;

determining attributes of the inter-domain links remaining after the removal step;

generating a virtual network topology by combining the logical links and their associated attributes with the remaining inter-domain links and their associated attributes; and determining a best end-to-end route by analyzing said virtual network topology.

2. The method according to claim 1, wherein said step of generating the domains topology further comprises:

at an intra-domain path computation entity in each domain, generating inter-domain data including details of the domain border elements and their inter-domain links and sending said inter-domain data to an end-to-end path computation entity; and at the end-to-end path computation entity, using said inter-domain data to generate the domains topology.

3. The method according to claim 1, wherein said step of receiving a request for computation of a path from a source entity in a source domain to a destination entity in a destination domain further comprises: generating an end-to-end path request including details of the destination entity of the path and any attributes required for that path, and sending the end-to-end path request to an end-to-end path computation entity.

4. The method according to claim 2, wherein said step of removing from the domains topology all domains and inter-domain links that are unlikely to be traversed in the requested path is carried out at said end-to-end path computation entity upon receipt of said end-to-end path request.

5. The method according to claim 1, wherein said step of computing candidate intra-domain paths for each remaining domain further comprises:

at an end-to-end path computation entity, generating a virtual Domains Topology request for each domain including the following:

each of the border elements of each domain that may feature in the end-to-end path, any attributes required by said end-to-end path, and for the source and destination domains, also the source entity and the destination entity, respectively;

sending said virtual Domains Topology request to intra-domain path computation entities of the source domain, of the destination domain, and of all possible transit domains substantially simultaneously; and upon receipt of the virtual Domains Topology request at each intra-domain path computation entity, computing the candidate intra-domain paths for the request.

6. The method according to claim 1, wherein said step of determining the attributes for each logical link further comprises determining a cost parameter that represents the availability/suitability of the logical link with respect to the other logical links computed within that domain.

7. The method according to claim 5, wherein said step of generating a virtual network topology further comprises:

at an intra-domain path computation entity, sending a virtual Domains Topology reply to the end-to-end path computation entity, the reply including the following:

the identified logical links, the border elements that feature in the logical links and the associated attributes, and for the source and destination domains, also the source entity and the destination entity, respectively; and upon receipt of the virtual Domains Topology reply at the end-to-end path computation entity, combining the logical links and their associated attributes with the remaining inter-domain links and their associated attributes.

8. The method according to claim 1, wherein an attribute for a logical link is given as a percentage of the total network resources that are available for the logical link within the corresponding domain.

9. The method according to claim 1, further comprising, at an intra-domain path computation entity, monitoring its inter-domain data and sending updates of the inter-domain data to an end-to-end path computation entity.

10. The method according to claim 9, further comprising sending updates of inter-domain data to the end-to-end path computation entity when changes in the inter-domain data cross a defined threshold.

11. The method according to claim 5, wherein said step of generating the virtual Domains Topology request for each domain comprises: including within the virtual Domains Topology request, an identification of the attributes to be determined by the domain-specific intra-domain path computation entity.

12. The method according to claim 5, wherein said step of generating a virtual Domains Topology request for each domain further comprises: including within the virtual Domains Topology request an identification of a routing strategy or algorithm to be used by the intra-domain path computation entity to compute the candidate intra-domain paths.

13. A method of constructing an end-to-end routing path from a source entity in a source domain to a destination entity in a destination domain across multiple domains supporting packet based connection oriented technologies, the method comprising the steps of:

receiving inter-domain data from each domain-specific intra-domain path computation entity, said inter-domain data including information relating to each border element of each corresponding domain and the links between those border elements of each domain and border elements of other domains;

generating a domains topology identifying all possible domains from said multiple domains, the border elements of those domains, and the inter-domain links among those domains;

receiving an end-to-end path request from the source entity, said end-to-end path request including details of the destination entity of the path and any attributes required for that path;

removing from the domains topology all domains and inter-domain links that are unlikely to be traversed in the requested path;

generating the following for each domain remaining after the removal step:

a virtual Domains Topology request including each of the border elements of that domain that may feature in the path and any attributes required by said path;

sending said virtual Domains Topology requests to intra-domain path computation entities of the source domain, of the destination domain, and of all possible transit domains;

receiving a virtual Domains Topology reply from each domain receiving corresponding virtual Domains Topology request, the virtual Domains Topology reply including logical links, each logical link representing corresponding domain-specific candidate intra-domain path and its associated attributes, wherein each candidate intra-domain path is capable of inclusion in the requested path from the source entity to the destination entity;

determining the attributes of each inter-domain link remaining after the removal step;

generating a virtual network topology by combining the logical links and their associated attributes with the remaining inter-domain links and their associated attributes; and determining a best end-to-end route by analyzing said virtual network topology.

* * * * *